United States Patent
Hasse et al.

(10) Patent No.: US 8,942,948 B2
(45) Date of Patent: Jan. 27, 2015

(54) DEVICE AND METHOD FOR MEASURING AND/OR GENERATING ELECTRICAL VARIABLES

(75) Inventors: Dirk Hasse, Paderborn (DE); Andreas Hostmann, Paderborn (DE); Robert Polnau, Paderborn (DE)

(73) Assignee: dSPACE digital signal processing and control engineering GmbH, Paderborn (DE)

( * ) Notice: Subject to any disclaimer, the term of this patent is extended or adjusted under 35 U.S.C. 154(b) by 438 days.

(21) Appl. No.: 13/350,036

(22) Filed: Jan. 13, 2012

(65) Prior Publication Data

US 2012/0179413 A1    Jul. 12, 2012

Related U.S. Application Data

(63) Continuation of application No. PCT/EP2010/059252, filed on Jun. 30, 2010.

(30) Foreign Application Priority Data

Jul. 13, 2009    (DE) .......................... 10 2009 033 156

(51) Int. Cl.
    *G06F 15/00*    (2006.01)
    *G01D 21/00*    (2006.01)
    (Continued)

(52) U.S. Cl.
    CPC ............. *G01D 21/00* (2013.01); *G01D 1/00* (2013.01); *G01D 15/00* (2013.01); *G05B 19/0425* (2013.01); *G05B 2219/2637* (2013.01)
    USPC ............ 702/122; 702/188; 702/189; 702/190

(58) Field of Classification Search
    CPC .................................................... G06F 17/5009
    USPC .......................................... 702/22, 182–190
    See application file for complete search history.

(56) References Cited

U.S. PATENT DOCUMENTS

| | | | |
|---|---|---|---|
| 4,825,392 A | * | 4/1989 | Freeman ...................... 324/142 |
| 5,053,981 A | | 10/1991 | Ogata et al. |

(Continued)

FOREIGN PATENT DOCUMENTS

| | | |
|---|---|---|
| CN | 87106298 A | 3/1988 |
| CN | 1528629 A | 9/2004 |

(Continued)

OTHER PUBLICATIONS

Second Chinese Office Action for Chinese Application No. 201080027582.2 dated Jun. 26, 2014, English translation.

(Continued)

*Primary Examiner* — Phuong Huynh
(74) *Attorney, Agent, or Firm* — Muncy, Geissler, Olds & Lowe, P.C.

(57) ABSTRACT

An apparatus for measuring electrical variables includes an external measuring connection, and a converter that converts a plurality of measurement variables into respective electrical measurement variables of a single predefined type. A control device for controlling the converter is provided and at least one type of variable to be measured with the converter can be selected via the control device, and a converter for at least two types of variables to be measured respectively has at least one independent input stage that can be used to detect the measurement variable of the type to be measured and to convert it into a predefined or predefinable type of variable. An electrical signal provided at the measuring connection is analysed in a parallel manner with respect to at least two different criteria via at least two input stages for different types of variables to be measured.

23 Claims, 6 Drawing Sheets

(51) Int. Cl.
*G01D 1/00* (2006.01)
*G01D 15/00* (2006.01)
*G05B 19/042* (2006.01)
*G06F 11/30* (2006.01)

(56) References Cited

U.S. PATENT DOCUMENTS

2005/0203402 A1 9/2005 Angelsen et al.
2006/0276989 A1 12/2006 Ludwig et al.

FOREIGN PATENT DOCUMENTS

| CN | 101183912 A | 5/2008 |
| CN | 101478583 A | 7/2009 |
| DE | 29 50 583 A1 | 6/1981 |
| DE | 36 11 689 A1 | 10/1987 |
| DE | 37 27 856 A1 | 4/1988 |
| DE | 199 54 182 A1 | 5/2001 |
| JP | H 01-274080 A | 11/1989 |
| JP | H 02-45781 A | 2/1990 |
| JP | H 03-59476 A | 3/1991 |
| JP | H 07-198788 A | 8/1995 |
| JP | H 10-123198 A | 5/1998 |
| JP | H 10-332766 A | 12/1998 |
| JP | 2005-134405 A | 5/2005 |

OTHER PUBLICATIONS

Chinese Office Action for Chinese Application No. 201080027582.2 dated Nov. 14, 2013—English translation.
Japanese Office Action for Japanese Patent Application No. 2012-519959 dated (sent) Mar. 3, 2014—English Translation.

* cited by examiner

DEVICE AND METHOD FOR MEASURING AND/OR GENERATING ELECTRICAL VARIABLES

This nonprovisional application is a continuation of International Application No. PCT/EP2010/059252, which was filed on Jun. 30, 2010, and which claims priority to German Patent Application No. DE 10 2009 033 156.5, which was filed in Germany on Jul. 13, 2009, and which are both herein incorporated by reference.

BACKGROUND OF THE INVENTION

1. Field of the Invention

The invention relates to a device and a method for measuring electrical variables, having at least one external measuring connection, which can be connected to an electronic device to be tested. The invention relates further to a method for measuring electrical variables of an electrical signal of an electronic device to be tested, the signal, which is to be measured, being applied at an external measuring connection of a measuring device.

The invention relates further to a device for generating electrical variables, having at least one external connection, which can be connected to an electronic device to be tested. The invention likewise relates to a method for generating an electrical variable via at least one generating device, whereby the generating device has at least one external connection, which is connected to an electronic device to be tested.

2. Description of the Background Art

A device for measuring electrical variables forms an arrangement which can often also be called a measuring channel in common usage. In this regard, the concept of a measuring channel can be understood to be an arrangement of electronic components, whereby a measuring channel on the input side has a measuring connection, at which an electrical signal to be measured can be applied, and on the output side provides a measured value, e.g., at an output connection or in a retrievable memory or by other measures.

In an equivalent way, the device for generating electrical variables concerns an arrangement which is often also called a generating channel in common usage. Within the meaning of the invention, this can relate to an arrangement of electronic components to which on the input side information, e.g., a value or an electrical signal, is provided and which on the output side has an output connection at which a signal formed from the information can be tapped.

The aforementioned devices or methods can be used to test any type of electrical or electronic devices. In an example use, the device can be used to test control devices for motor vehicles. This special application does not in any way limit the invention described hereafter and serves only as an example for clarifying the function. If use in a motor vehicle control device is mentioned in an example, this example is to be understood generally also for any other type of electronic device.

It is known in the conventional art, for example, to test vehicle control devices in a simulated environment, to thus check the behavior of a vehicle control device simulatively in a later, actual, real-time operation. This type of test is typically called, for example, HIL ("hardware in the loop").

It is essential for such a test of a vehicle control device that such a vehicle control device is acted upon from the outside by certain electrical variables, for example, by electrical variables that occur in specific real-time operation during driving of a motor vehicle.

This can refer, e.g., to electrical variables which are provided by certain sensors, operable elements, etc. It is typically provided in this case that a vehicle control device provides output variables depending on input variables after processing or also independent of input variables; these output variables are to be detected and evaluated during a test. In summary, it is therefore essential for conducting such a test, that, on the one hand, electrical variables are provided to a vehicle control device at its inputs and that, on the other, electrical variables are detected and evaluated from the outputs of a motor vehicle device, particularly whereby input variables are provided as part of a simulation and output variables are also processed as part of a simulation.

An electrical variable can be understood to be a variable that is represented by a variable value and a variable type. Typical variable types can be, for example, but not exclusively, current, voltage, resistance, etc.

It can also be provided as part of the invention to process general physical variables, also of a nonelectrical type, which, however, is then represented technically by an electrical variable. For example, the variable types—force, torque, weight, length, time, angle, etc.—can be represented within the scope of a test for a vehicle control device by corresponding electrical variable types, for example, in that a sensor that measures such a variable type provides a corresponding output signal, proportional to the variable, in the form of an electrical variable, e.g., as a voltage or resistance or also a flowing current.

A variable value is further a numerical value and a unit of measurement. For example, a current of three amperes represents a physical variable of the variable type, current, with a variable value that results from the numerical value 3 and the unit of measurement ampere. This applies analogously to any other physical, particularly electrical variables.

Because, as is evident, different physical, particularly electrical variables can be generated or measured only by different measures, it is known in the conventional art that a device adapted for this special variable type is used for measuring or generating a specific physical or electrical variable. Several such devices for measuring or generating a specific physical or electrical variable are often realized on a common interface card or plug-in card for a data processing card.

This means that as part of a test for an electrical device, such as, for example, a vehicle control device, a plurality of different devices must be provided to be able to process the plurality of different physical and particularly electrical variables to be measured or also generated, which arise during a test.

For this reason, prior testing setups are extremely complex and in each case adapted individually to a simulating task to be completed. Known testing devices therefore are complex, cost-intensive, and inflexible, because they can be used only for a specific simulation task to be considered. If other aspects are to be considered as part of a simulation, the corresponding testing device must be changed and adapted to the new task, which is also laborious and cost-intensive.

Channels for measuring or generating a particular physical or electrical variable on a card may also remain unused and, moreover, another card with possibly likewise excessive channels must be used for measuring or generating another physical or electrical variable, as a result of which the space requirement and cost of the system increase.

Moreover, it has been regarded as very disadvantageous thus far in the conventional art that higher-order data processing systems as well, particularly in their programs running therein, must have appropriately adapted interfaces, to be able to deal with measured values of physical, particularly electrical variables of different variable types, and also, if necessary, to be able to create different variable types simulatively.

SUMMARY OF THE INVENTION

It is therefore an object of the invention to provide devices and methods with which the management of different electrical variables for measuring and generating electrical variables in/for electrical signals can be simplified. In particular, downstream or upstream data processing for further processing of measured electrical variables or for generating specific electrical variables is to be simplified as well. Further, the interconnection effort should be reduced by reducing the necessary number of electrical connections (inputs/outputs) or channels, which were needed thus far for different tasks.

According to a first aspect, this object is attained by a device or a method for measuring electrical variables, in which a converter is provided, which is set up to convert a plurality of measurement variables, measurable/measured via the measuring connection, of different variable types to be measured, particularly the variable types current and/or voltage and/or resistance, into respective electrical measurement variables of a single predefined/predefinable variable type, particularly the variable type voltage, whereby a control device for controlling the converter is provided and at least one variable type to be measured with the converter can be selected by means of a control, and a converter for at least two variable types to be measured has in each case at least one independent input stage, which can be used to detect the measurement variable of the variable type to be measured and to convert it into a predefined/predefinable variable type, whereby the converted measurement variable of the predefined/predefinable variable type is present at a signal output of the input stage.

It is therefore the main idea here in the case of such a device or the method of the type according to the invention that a standardization is performed, namely, in the sense that by means of a converter of the device a plurality, particularly sequentially a plurality of measurement variables, measured or measurable via the same measuring connection, of different variable types to be measured are converted to the respective electrical measurement variables of only a single predefined/predefinable variable type.

A device of this type or the method has a high flexibility by virtue of the occurring standardization to a variable type, because any electrical variables of an electrical signal of a device, e.g., a vehicle control device, can be detected on the input side, but in this case there is always a variable of the same variable type within the device or also on the output side, or also for later further processing independent of the incoming variable type.

Thus, for example, it can be provided that input variables—of the variable types current, voltage, resistance, or other electrical input variable types—are always converted by means of the device of the invention or according to the method into a variable of the variable type voltage. All of the downstream components in the device then only need to be directed to process electrical variables of the variable type voltage, which greatly simplifies the subsequent processing, and also permits combining different processing types selectively in a simple manner.

In this case, it can be provided further that an input side variable value which is within a specified input-side numerical interval is converted with the conversion into a predefined output-side numerical value interval. It can be provided, for example, that depending on the electrical variable to be measured on the input side, a voltage within the interval of 0 to 5 V is always provided on the output side. Thus, a conversion or standardization with respect to the variable type and preferably in a refinement of the variable value as well occurs accordingly.

This type of device or the described method thereby has the advantage that a higher-order data processing system, which processes measured electrical variables of devices, such as, for example, vehicle control devices, further, for example, within the scope of a simulation, no longer needs to provide different interfaces as in the conventional art, but it is sufficient in the present case that only input variables of the one and only specified predefined or predefinable variable type, such as, for example, the variable type, voltage, can be processed further by a data processing system, in particular with the further proviso that the variables are given only in a specific numerical interval, e.g., from 0 to 5.

As a result, major resources for memory space and processor loads and for hardware components can be eliminated in a data processing system with which a device of the type of the invention is working or which carries out the method of the invention alone or with a device of this type. Moreover, new possibilities for interaction or scalability arise, because a data processing system can work together in the same way with a specific interface with a plurality of devices of the invention.

Also, in the device or method of the invention, a control device for controlling the converter is provided, whereby at least one of the variable types to be measured by the converter can be selected by means of a control.

It is therefore possible to specify individually which variable type is selected at a particular time for measuring purposes by means of software, which can run, for example, within the control device, e.g., software that is stored by a higher-order data processing system in the control device and was started, or also by means of programmed logic gates (FPGA, field programmable gate array) and their function. It is therefore possible to use the very same device for measuring electrical variables to measure an electrical signal at a specific time with respect to a first variable type, and at another time with respect to another electrical variable type.

Furthermore, it is provided within the scope of the invention in the case of the device and method that a converter has in each case at least one independent input stage for at least two different variable types to be measured. Accordingly, the measurement variable of a specified variable type can be detected and converted/standardized to a measurement variable of the predefined/predefinable variable type with each of these independent input stages, whereby it is then provided that the converted measurement variable is available at a signal output of the input stage in question in this particular variable type for further processing.

It is thus possible, apart from a temporal sequential switching (time-division multiplexing) of the various provided input stages, to enable parallel operation as well of the at least two input stages; i.e., at least two of the input stages of all provided input stages can be operated in parallel. Whereby during parallel operation, it can also be provided that these input stages provide their respective converted measurement variable of the same predefined/predefinable variable type simultaneously in each case at their signal output.

For example, there is the possibility therefore from an electrical signal, which is provided in an electrical device (control unit) at a measuring connection, to analyze the signal in parallel with respect to at least two different criteria. For example, both the voltage at the measuring connection and also the current flowing across the measuring connection can be detected, when in this example at least two input stages are provided in the device, the stages which are used to measure the voltage, on the one hand, with an input stage and, on the other, to measure the current with another input stage, whereby both measurement variables are converted according to the invention into the predefined or predefinable measurement variable.

In an embodiment, it can be provided for different variable types to be measured, in addition to the different input stages, that a converter for at least one, preferably each variable type to be measured has at least two independent input stages, each with a different electrical function/functionality, by means of which the same measurement variable of the variable type to be measured is detectable and convertible to a measurement variable of the predefined/predefinable variable type. For example, different functions/functionalities can be seen in that the different input stages are set up to detect variables very accurately, to detect them very rapidly, to filter them for different types, etc. For example, an input stage can also be set up to detect the measurement variable digitally and another input stage can be set up to detect the measurement variable analogically.

It is therefore also possible to evaluate an electrical signal with respect to different criteria, for example, if an analog input stage is provided to detect a voltage of an electrical signal and at the same time a digital input stage is provided to detect the voltage.

A signal can be detected, e.g., with the digital input stage especially rapidly and time-resolved, whereas it can be provided in an analog input stage to carry out a filtering of the applied electrical signal and accordingly to detect the filtered electrical input signal in regard to the desired electrical variable, such as the voltage in this example. Of course, this example applies not only to the detection of voltage as the measurement variable, but also to any other type of measurement variables.

In an embodiment of both the method and the device, it can be provided further that the device has at least two signal evaluation units and, according to the method, the converted measurement variable of the predefined/predefinable variable type can be evaluated/processed or is evaluated or processed by means of these at least two signal evaluation units with respect to a desired or selected technical criterion, whereby each signal evaluation unit is assigned a different technical criterion.

Different technical criteria can be recognized, e.g., in that the numerical variable value is determined from the converted predefined/predefinable variable type. According to another technical criterion, the variable value, e.g., can be compared with the reference value, which is predefined in the device and can be changed, if necessary. In this regard, any technical criteria are conceivable.

It can be regarded as especially advantageous when a signal evaluation unit can be switched selectively by control by means of a control unit to one of at least two signal outputs, whereby each signal output is assigned to a different input stage.

Thus, it is again possible here to switch one and the same signal evaluation unit either one after the other in time at different input stages (time-division multiplexing) and thereby to determine in an exemplary application the variable value in a first case of a measured voltage and in a second case of a measured current or a resistance or the like, whereby in another application there is also the possibility to carry out simultaneously by means of different signal evaluation units a parallel analysis for different technical/electrical criteria, such as, for example, measurement of the absolute value and comparison with a reference value.

Thus, at least two signal evaluation units can be operated simultaneously in parallel and provide their respective evaluation or processing result to a control unit. This result can be stored in a control unit of this type, for example, for retrieval or for sending to a higher-order data processing system, in order to be used as part of a simulation.

In this case, there is the possibility of storing the evaluation and/or processing results of each signal detection unit also as a function of other parameters, such as, for example, as a function of time or also a motor rotation angle, which is made available in real time or also by a simulation by a data processing system of the device according to the invention or as part of the method.

Apart from the detection of various electrical variables, it is also provided within the scope of the invention according to another aspect to provide a device and a method by which, to attain the object of the invention, electrical signals can also be generated which have or represent desired electrical variables. Such signals can be generated to provide these to an electrical or electronic device, especially a vehicle control device, and thereby to form an input variable for such a device, e.g., depending on which the device to be tested undertakes further processing and optionally provides a return signal.

To achieve a high flexibility according to the invention here as well, it is provided that in the case of the device or the method a converter is provided which is set up to convert an electrical variable, applied at its input, of a single predefined/predefinable variable type, particularly the variable type voltage, into a variable of the variable type which can be selected from a plurality of different generatable variable types, in particular the variable types—current and/or voltage and/or resistance,—and to output them via the connection, whereby a control unit is provided for controlling the converter and by means of a control a variable type to be generated by the converter can be selected and a converter for at least two variable types to be generated has in each case at least one independent output stage, by means of which from an electrical variable of the predefined/predefinable variable type the electrical variable of the variable type to be output, which is available at an output of the output stage, can be output.

In a similar way, as previously described for the input side in the detection of electrical signals, the device of the invention or the described method on the output side also profits from a conversion or standardization in regard to the variable type to be used. It is provided in each case to supply the generating device of the invention with an electrical variable of only a single variable type and to determine by a selection according to the invention the type of the converted electrical variable.

Thus, it is possible here as well to operate a device of the invention with another higher-order data processing system, which need only be able to provide variables of a single specified variable type in order to select a variable desired for output from this single electrical variable from a group for the selection of available electrical variables.

It can be also provided here in turn that a device of the invention has a control unit which is used to control the aforementioned converter in order to select a variable type, which can be generated with the converter, by means of the control.

It can be provided further that not only is there a conversion/standardization with respect to the variable type, but that also a more extensive standardization with respect to the variable value is used. In the same example, which uses voltage as the predefined variable type, it can be provided here as well that variable values within the range of 0 to 5, accordingly therefore electrical variables of the predefinable variable type within the range of 0 to 5 V are used, to form essentially any output signal of the same or preferably different variable type from such an electrical signal, which can be generated within the device or also externally.

It can be provided further here according to the invention that a converter for at least two variable types to be generated, has in each case an independent output stage, by means of which the desired electrical variable of the variable type to be output can be output from an electrical variable of the predefined/predefinable variable type, which is then available at an output of this respective output stage. All outputs of all output stages can be combined into a common external connection, in particular, when the output stages do not operate simultaneously but one after another in time. It can then also be provided to connect the unused output stages at their output in a high-impedance manner in order not to influence any other output stages.

It can also be provided here that the respective outputs of all present output stages of the converter can be switched by means of a switch array selectively to the external connection of the device, or be switched application-specific, particularly so that the external connection of the device for generating electrical variables at a specific time is always connected only with precisely one output connection of a selected output stage. Thus, a time-divided multiplexing can also occur in the selection of the output stages to be used.

It can also be provided here as well that by means of a control unit, which is provided in the device, switching between the different provided output stages is carried out. Depending on the selection of the relevant output stage, in this case optionally electrical variables of different variable types to be output can also be generated sequentially in time with the same electrical input variable of the predefined variable type.

It can be provided further here that a converter for at least one, preferably each variable type to be generated, has at least two independent output stages, whereby each of these output stages is set up to generate the same variable with different electrical criteria and/or functions; for example, an output stage can be set up to output a variable digitally and an output stage can be set up to output the variable analogically.

Further, it can be provided in an embodiment that a device has at least two generator units, by means of which an electrical variable of the predefined/predefinable variable type can be generated, to then convert it, whereby each generator unit is assigned a different technical generation type. For example, one generation type can be analog and another generation type can be digital. It is possible here as well to switch a generator unit selectively by the control by means of a control unit to a signal input of a desired output stage. The selection of the generator unit can also be done by the control unit. Information depending on which the selected generator unit generates an electrical variable of the predefined/predefinable variable type can be present, e.g., in the control unit and/or be sent from the control unit to the generator unit.

It can be provided further according to the invention that the methods for measuring electrical variables and the previously described methods for generating electrical variables, like the devices provided for this in each case, can be carried out by means of one and the same device.

A single device accordingly can include a previously described device for measuring and also a previously described device for generating electrical variables. In this case, accordingly, the device can be switched, for example, between the function as a measuring device or the function as a generating device or according to the understanding mentioned above as a measuring channel or generating channel.

This embodiment of the invention further has the advantage that the aforementioned control units of a measuring and/or generating device can also be formed in the present case by the same common control unit. It can be provided here that a plurality of measuring and/or generating devices in fact have a common control unit, but within such a control unit for each device a separate, individually exchangeable program is running or separate, individually exchangeable gate functions are running.

A combined measuring and generating device, however, may also have the function of measuring or generating in each case independent control units, particularly which can communicate with one another for the purpose of data exchange, particularly for correlating their respective mode of operation with one another.

A control unit, either that of the measuring or the generating unit or a control unit common to both devices, may have, according to an embodiment of the invention, a microprocessor or a processor unit implemented in an (part of an) FPGA, and programmable by software or a programmable/programmed arrangement of logic gates (FPGA, also partially configurable) and has a program memory and/or data memory, whereby it may be provided that a program runs or gate functions run in this control unit for the selective connection of signal evaluation units or generator units to one of the signal outputs or signal inputs of the input stages or output stages, respectively, whereby it may also be provided further that a parameterization of the input stages or output stages and/or the signal evaluation units or generator units can also be carried out by means of such a control unit.

Information, particularly simulated information, on a motor rotation angle and/or the time can be provided to the control unit especially by a higher-order data processing system. In an embodiment, the possibility also exists that a control unit can be set up to change a parameterization during the runtime of the measurement and/or generation of an electrical signal, particularly as a function of the motor rotation angle and/or time.

For example, depending on the motor rotation angle and/or time during a measurement in a signal evaluation unit, which is carrying out a comparison with a reference value, the value of the reference value can be changed in order to obtain different comparison results, for example, during the performed measurement.

Such a change can be provided, for example, to determine the start and end of a fuel injection, for which in the signal course of an output signal of an injection unit at different times or motor rotation angles there can be significant signal changes, particularly with a falling and/or rising edge, which can be clearly discriminated from one another by the change in the reference value during the measurement.

It is also possible further that the device is set up, depending on the measured and/or generated events in a measured or generated signal, to store the motor rotation angle and/or times predominating during these events and/or send them to a data processing system. Such stored information can be used, for example, as part of a simulation during a test of a vehicle control device.

It is also possible in this case to use simultaneously the control units of several, particularly similar devices of the previously described novel type and to allow these to communicate with one another and/or with a data processing system with a bus, for example, to thus operate by means of a higher-order data processing system different similar novel devices in parallel and thereby to again expand the variety of measuring and generation options existing in any case. It can be provided thereby that the motor rotation angle and information on time are made available simultaneously to all of the involved devices.

Several (at least two) of the aforementioned devices of the invention can be realized, e.g., on a common interface card or plug-in card for a data processing system. Such a card may then have several corresponding measuring and/or generating channels. It can be provided here that several measuring and/or generating devices in fact have a common control unit, but within such a control unit for each device a separate, individually exchangeable program is running or separate, individually exchangeable gate functions are running.

The flexibility of the invention of the individual channels makes it possible to carry out different measuring and generating functions with a single interface card and also to change or exchange these functions. Thus, the number of required interface cards and thereby also cost can be reduced if necessary.

The aforementioned input stages and the output stages, each of which perform the conversion between the variable types, can be realized electrotechnically, e.g., by operational amplifiers or programmed logic gates (FPGA), particularly those that are externally wired or configured according to the specific conversion task. It is possible here as well to change the external wiring/configuration by a control unit and thus to assign different electrical functions to the very same input stage or output stage.

BRIEF DESCRIPTION OF THE DRAWINGS

The present invention will become more fully understood from the detailed description given hereinbelow and the accompanying drawings which are given by way of illustration only, and thus, are not limitive of the present invention, and wherein.

DETAILED DESCRIPTION

Figure 1:
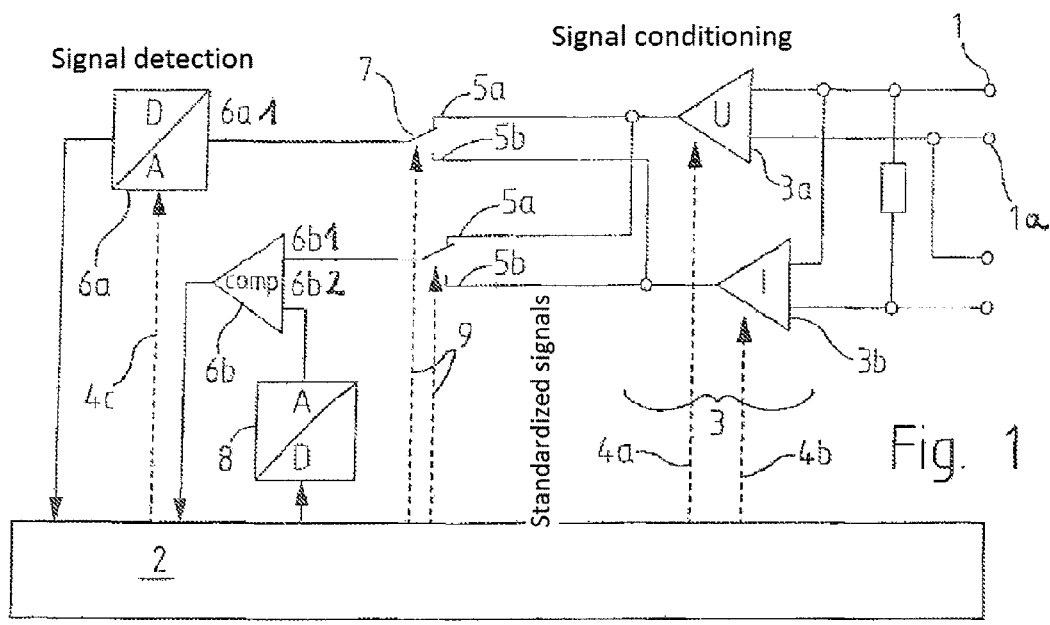
FIG. 1 illustrates a first device for measuring electrical variables.

In a schematic illustration FIG. 1 shows a device according to an embodiment for measuring electrical variables, which form a measuring channel in common usage.

A measuring channel can be understood to be any arrangement that has a measuring connection on the one side and on the other provides the result of a measurement in a prepared form to be able to process this result of the measurement further, for example, with a data processing system.

The arrangement illustrated here in FIG. 1 represents a measuring channel, which in this example extends from a measuring connection 1 of a vehicle control unit ECU to control unit 2, where the result of the detection by measuring technology with this device is stored in a memory, not shown here separately, and made available for further processing.

It is to be assumed in the further and general understanding in this case that an electrical signal at a measuring connection 1 is always to be regarded in relation to a reference. For example, the result of the measurement of a voltage always arises only for one reference potential, particularly a ground potential. Measuring connection 1 of a vehicle control unit ECU is accordingly substantially divided into a conductor 1, carrying the actual electrical signal, and a conductor 1a with a reference, substantially a ground potential.

FIG. 1 makes clear here the internal exemplary structure of a device of the invention, according to which the external measuring connection 1 is routed to a converter 3. The converter 3 in the present embodiment has two independent input stages 3a and 3b, whereby it is provided here in this example by means of input stage 3a to undertake a measurement which provides information on the voltage present at measuring connection 1 and whereby input stage 3b here in this example is provided to detect the current that flows across measuring connection 1.

The two input stages 3a and 3b can be selected and/or externally configured/parameterized/scaled by control unit 2 via control lines 4a or 4b. A selection can be made thereby in such a way that the two input stages 3a and 3b are operated either sequentially in time, for example, depending on a predefined time or motor rotation angle, or parallel in time as well. In a configuration/parameterization, e.g., a functionality (e.g., amplification, filter characteristic, etc.) can be changed by the control unit. Independent of this operating mode, each of input stages 3a and 3b, about which basically still more can be provided in a generalized realization, provides its particular output variable, standardized to the same variable type, at its respective signal output 5a or 5b, whereby signal output 5a is assigned to input stage 3a and signal output 5b to input stage 3b.

According to the invention, a conversion has occurred here, namely, in such a way that both the measured voltage and the measured current at measuring connection 1 were converted by the respective input stage into an output variable of the very same variable type, such as, for example, the variable type voltage. Accordingly, a voltage signal of a specific variable is present at signal outputs 5a and 5b in each case, whereby the voltage signal at signal output 5a is proportional to the measured voltage at measuring connection 1 and the voltage at signal output 5b is proportional to the current across measuring connection 1.

It is evident accordingly that the device of the invention, as FIG. 1 shows, has the particular advantage that any electrical component, which follows in the processing chain after signal outputs 5a and 5b, needs to process only electrical variables of one and the same variable type, namely, in this example the variable type voltage, which greatly simplifies further interconnection and the structure of a device according to the invention.

It is provided here furthermore to now provide different signal evaluation units 6 in the device of the invention, namely, in this case two evaluation units 6a and 6b. In this case, a signal evaluation unit 6a, e.g., can be provided to convert a voltage present at its input 6a1 into a digital value and to provide it to control unit 2. The signal evaluation unit 6a can be configured and/or parameterized, e.g., by control unit 2 via a control line 4c.

Signal evaluation unit 6b can be provided, for example, to compare a voltage present at its input 6b1, with a voltage, present at a different input 6b2, and to send a result on the comparison such as, for example, the information "greater" or "smaller," to control unit 2.

The particular inputs of the signal evaluation units in this realization are routed to switchable switches 7 in order to enable in this way, depending on external signals, which, for example, can come from control unit 2, connection of any possible signal output provided by the device to an input of any signal evaluation unit.

In this example, the specific illustration shows that signal input 6a1 of signal evaluation unit 6a is connected to signal output 5a of input stage 3a and simultaneously signal evaluation unit 6b is connected with its input 6b1 to the same signal output of input stage 3a. At this time of measurement, accordingly, possibly available information on the current at the measuring connection remains unconsidered, whereas the information on the voltage at the measuring connection is evaluated with respect to two different criteria simultaneously; namely, on the one hand, its absolute value is detected by signal evaluation unit 6a and provided to control unit 2 and, on the other, a comparison is made by signal evaluation unit 6b, which may represent a comparator, whether the measured voltage is greater or smaller than a provided reference value, which can be applied by means of control unit 2 here particularly via a digital-to-analog converter 8 to second input 6b2 of signal evaluation unit 6b.

It is thus evident that at other times or as a function of another motor rotation angle both the active input stage can be selected by a selection with control lines 4a and 4b and also by switching of switch 7 with corresponding control lines 9, a reconfiguration of the device can be undertaken as to which of the input stages and which of the provided converted measurement variables are processed further subsequently in the signal evaluation.

Figure 2:
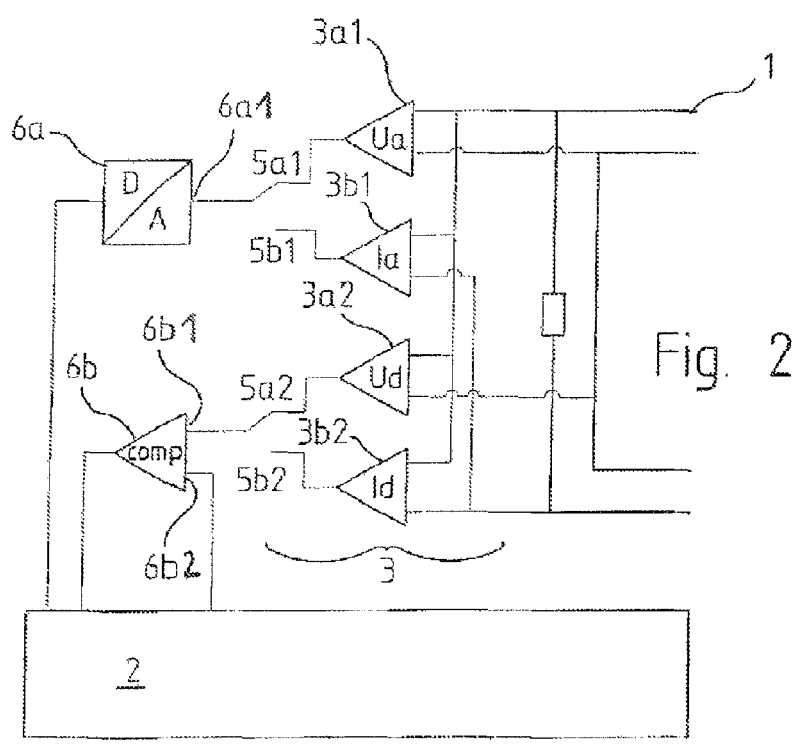
FIG. 2 illustrates a second alternative device for measuring electrical variables.

In comparison with FIG. 1, FIG. 2 shows a preferred refinement of a device of the invention for measuring electrical variables, in which the number of input stages in converter 3 is increased compared with FIG. 1.

FIG. 2 like FIG. 1 also shows input stages for detecting and converting electrical variables of the variable type, voltage and current, whereby it is provided further here to be able to detect the specific variable type both digitally and analogically. Thus, converter 3 here has a total of four input stages, whereby for detecting a voltage as a measurement variable, input stage 3a is subdivided into input stage 3a1 to measure the voltage analogically and 3a2 to measure the voltage digitally. Input stage 3b in turn is subdivided into an input stage 3b1 for analog detection of the current and 3b2 for digital detection.

In this regard, as already described in the general section, all input stages are set up to undertake a detection and conversion of the measured electrical variable into the predefined or predefinable variable type and thus to make available in turn at the respective signal outputs 5a1, 5a2 or 5b1 and 5b2 the electrical variables converted at least into the variable type.

Without an illustration of control lines 9 or 4a and 4b, as in FIG. 1, it is provided here as well to connect selectively inputs 6a1 and 6b1 of signal evaluation units 6a and 6b, which are present here identical to FIG. 1, to one of the signal outputs 5. In this regard, only the possibility is illustrated here in the case of signal evaluation unit 6a to switch between signal outputs 5a1 and 5b1 and in the case of signal evaluation unit 6b to switch only between signal outputs 5a2 and 5b2. Of course, it can also be provided here to be able to switch on inputs 6a1 and 6b1 basically at all signal outputs 5, available in the device, of any input stage of converter 3.

Figure 3:
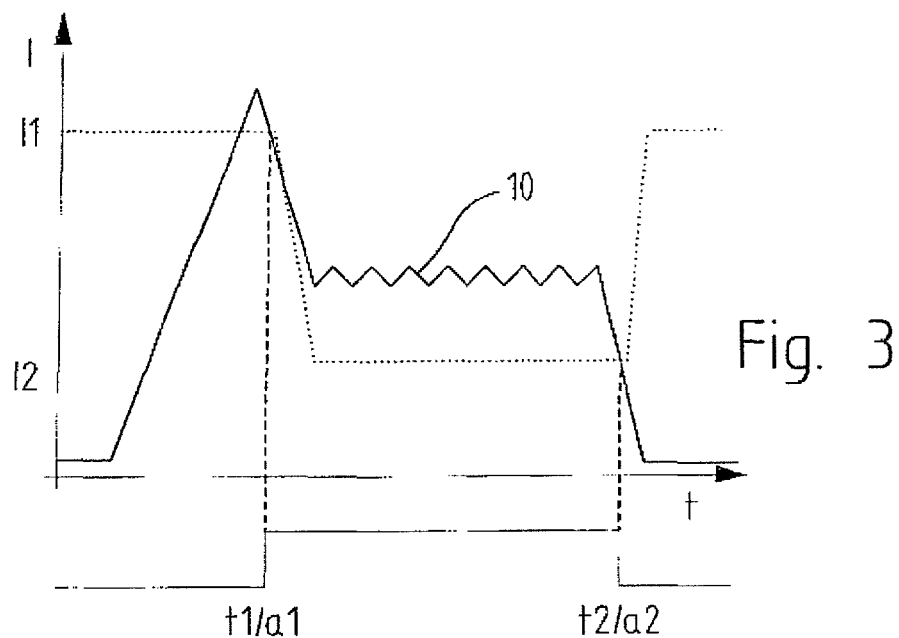
FIG. 3 illustrates a use during the measurement of an injection pulse.

FIG. 3 shows a possibility by means of a device according to FIG. 1 or also FIG. 2 to detect an injection pulse of a motor vehicle device by measurement techniques. The current course which occurs during an injection at a magnetic injection valve is shown in FIG. 3. For example, by means of selection or activation of input stage 3b of a device according to FIG. 1 or FIG. 2, accordingly a measurement of this current through the injection valve can be made and be present at signal output 5b of this input stage as an electrical measurement variable of the predefined variable type, here, for example, as a converted or standardized voltage. It is shown further in FIG. 3 that, for example, the specific current course is recorded versus time with signal evaluation unit 6a and has the course 10 shown in FIG. 3.

With the same device, a comparison can also be made by simultaneous selection of signal evaluation unit 6b in terms of whether the current through the injection valve or after the conversion by input stage 3b the converted standardized voltage at output 5b is greater or smaller than a threshold value applied by the control unit at the comparator, which forms signal evaluation unit 6b.

Here, depending on the time, the signal evaluation unit or comparator 6b can be supplied with different threshold values, for example, first with a threshold value I1, so that the comparator at time T1 or with motor rotation angle a1 provides a signal that the threshold in the falling edge of the current has not been achieved and thereby control unit 2 provides a corresponding signal or such information and the associated time or the motor rotation angle, when this occurs.

After this event is detected, it can then be provided, for example, that control unit 2 applies a new threshold, here particularly in turn via digital-to-analog converter 8 at the comparator, to now determine when the end of the injection process occurs, which is detectable in that current course 10 falls below threshold I2 at time T2 or at motor rotation angle a2.

This time or the associated motor rotation angle a2 can also be stored in control unit 2, so that the possibility is recognized here of analyzing simultaneously via a single external connection the signal course of the current with respect to different criteria and depending on the motor rotation angle and/or time to determine certain events in the signal course, such as, namely, here the duration of an injection pulse. This duration, the position in time and the motor rotation angle from the beginning and end of the injection pulse can be provided to a higher-order data processing system, for example, transferred via a data bus from control unit 2 to the data processing system.

Figure 4:
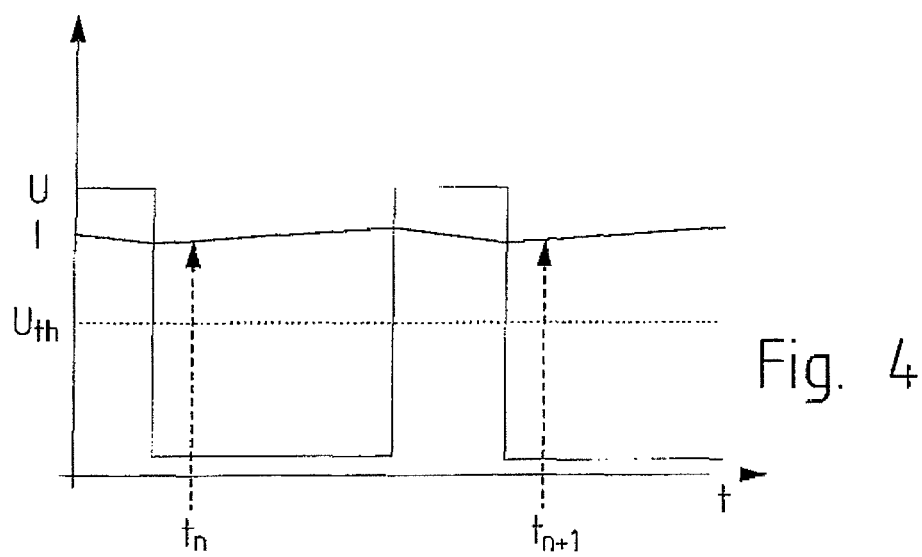
FIG. 4 illustrates a use in the case of a current measurement synchronous to a pulse width modulation.

FIG. 4 shows another possible application, in which instead of input stage 3b, as in the prior example of FIG. 3, input stage 3a is now used for voltage measuring, as shown in FIG. 1 or 2. It is then provided by means of the input stage 3a to determine the edges of the voltage U, as they are given by a pulse-width modulation, according to FIG. 2 in the digital portion 3a2 based on its speed during the measurement and simultaneously to measure the current with the analog current portion 3b1. In so doing, it is provided in this realization, after an edge in the digital voltage portion is determined by use of comparator 6b and a comparison with the threshold voltage UTH is made, to determine the time when the falling edge occurs and, proceeding from this, to wait for a certain time in order to then undertake a current measurement at times TN or TN+1, i.e., always in the equidistant time interval after a falling edge, for which purpose the current measurement can be carried out precisely at this point in time by means of input stage 3b1 according to FIG. 2 and signal evaluation unit 6a. In this case, it is possible to change both the switching threshold UTH and the waiting time after the determination of the falling edge during the runtime of a measuring procedure from the outside, for example, by loading different data into control unit 2.

It is evident here through the description of FIGS. 1, 2, 3, and 4 that highly diverse measuring tasks can be realized with one and the same device in each case only by internal switching of the device units, active together, i.e., the employed input stages and the signal evaluation units used in each case.

Figure 5:
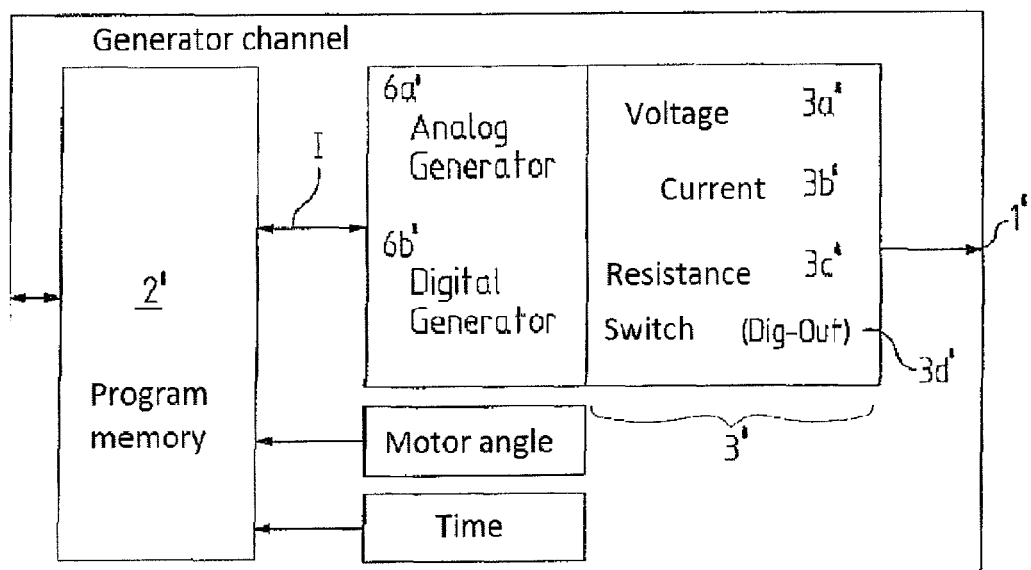
FIG. 5 illustrates a device for generating electrical variables.

FIG. 5 shows further in the schematic illustration a device of the invention for generating electrical variables. Within the meaning of the invention, it forms a generating channel in which information I is transmitted by a control unit 2 with a program or by means of gates and/or a data memory to one of two generator units 6*a*', 6*b*', to generate an electrical variable always of the same variable unit with one of the generator units and then to convert it. It is possible here within converter 3' to select the variable type from among several possible variable types into which the electrical input variable is to be converted in order to then provide it at an external connection 1'. For example, this external connection can be connected to an engine control unit which is not shown.

Here as well, as in the previous examples, it is provided that information on the motor angle and time can also be supplied to control unit 2', namely, to be able to perform a generation of electrical signals depending on this information. This applies both to this exemplary embodiment and also very generally to both devices according to the present invention.

Converter 3', which is shown schematically, may have different output stages 3*a*', 3*b*', 3*c*', and 3*d*', which can be selected depending on the information from control unit 2. There is accordingly the possibility of converting selectively the provided electrical variable of the predefined variable type into a voltage, current, resistance, or also only a switching signal, i.e., a digital output signal, such as simply "on" or "off."

The exemplary embodiment according to FIG. 5 shows the possibility that two different generator units 6*a*' and 6*b*' can be upstream of output stages 3*a*' to 3*d*', in order to influence the manner, i.e., either analog or digital, in which the particular variable type of the electrical variable to be generated is to be generated. Using these two different generators 6*a*' and 6*b*' there is the possibility, for example, of realizing a voltage source, current drain, a resistance simulation, or a switch output, to carry out a pulse-width-modulated output as a voltage source, current drain, a switch output, to realize a sinus generator as a voltage source or current drain, or a plurality of other types of generation such as, for example: wavetable generator as a voltage source/current drain, digital pulse generator, analog incremental coder, digital incremental coder, rotational speed sensors as a voltage source/current drain, potentiometer, knock sensors as a voltage source, etc.

Here, it is also basically possible to use more than one device of the invention, as it is shown in FIG. 5, together to realize a desired function, especially, e.g., a potentiometer function or also encoder functions.

In this case there is the possibility of connecting together several devices of the invention for realizing a single specific function for the device of the invention, both for generating and also for measuring electrical variables, whereby it may be provided that the specific devices communicate with one another over a bus system, especially that they can operate synchronously in time or synchronously in regard to the motor rotation angle.

Figure 6:
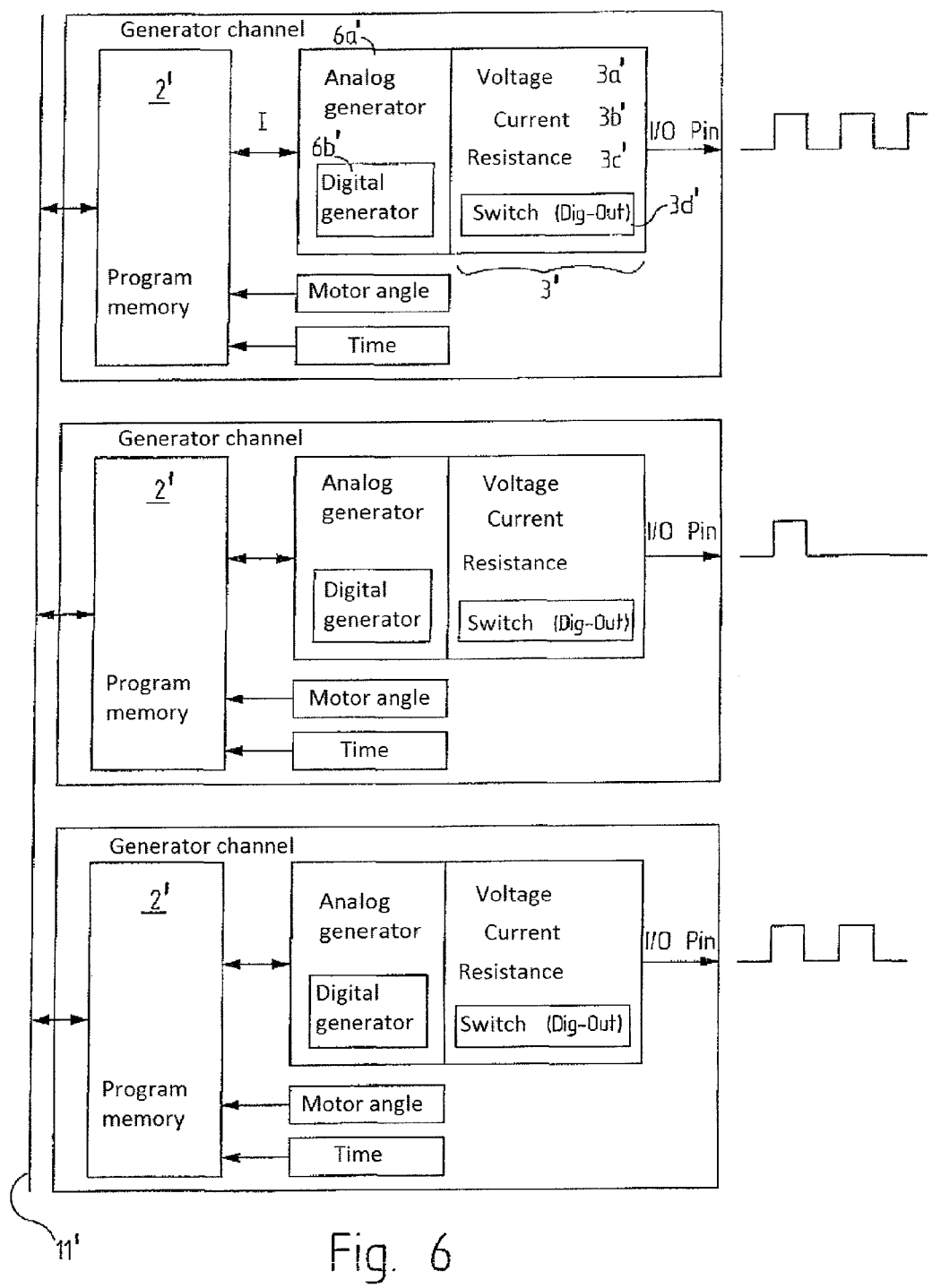
FIG. 6 illustrates a plurality of parallel-operated devices according to FIG. 5.

This type of interconnection of devices for generating electrical variables is shown in an example in FIG. 6. Several devices, as they were described for FIG. 5, operate in parallel here, whereby it is provided that the specific devices have a communication link via bus 11'.

The generation of a specific desired electrical variable can occur by means of a running program or the functionality of a logic gate in each of the individual devices. In the present case, this particular generation is not independent but correlated, e.g., synchronized to one another, in that the individual control units of the devices communicate with one another over bus 11'. Thus, a mutual information exchange, e.g., of control information, can occur that brings about a desired type of correlation.

Figure 7:
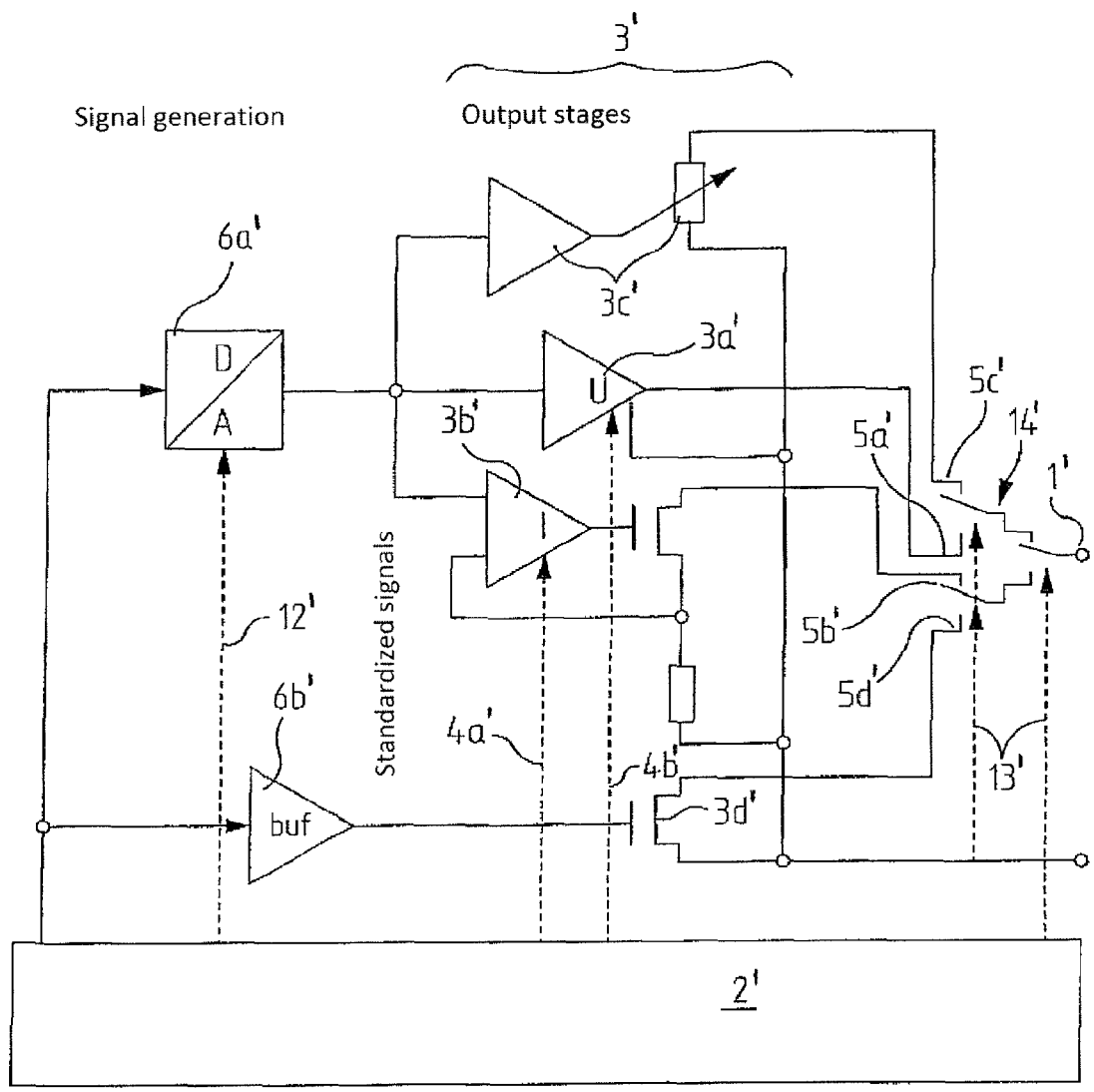
FIG. 7 illustrates an example of a device for generating electrical variables.

FIG. 7 shows a more specific example of a device for generating electrical variables. Shown here is a single device and thereby a single generating channel in conventional common usage.

FIG. 7 shows here an embodiment of a device described abstractly in FIG. 5. It is evident here that two different generator units 6*a*' and 6*b*' are provided, which are used to provide at output stages 3*a*', 3*b*', 3*c*', or 3*d*' of converter 3' a variable of the intended variable type, optionally with further standardization of the variable value.

Here, generator unit 6*a*' is configured specifically as a digital-to-analog converter and generator unit 6*b*' as a high-speed buffer or driver to switch output stage 3*d*'. For example, generator unit 6*a*' can be parameterized or configured differently via a control line 12' by control unit 2', e.g., also dependent on time or motor rotation angle.

The signals, standardized into the provided variable type, of generator units 6*a*' and 6*b*' in this realization are provided to converter 3' and are converted there into electrical signals of different selectable variable types. The individual output stages 3*a*', 3*b*', 3*c*', 3*d*' can also be parameterized or configured by means of control unit 2', which is symbolized here specifically for output stages 3*a*' and 3*b*' by control lines 4*a*' and 4*b*'.

The selection of the output stage used can occur, e.g., in that this stage is actively switched, optionally by a control line, which is not shown here, or the switching of the voltage supply. In such a case, only one of several provided output stages operate at one time.

It can also be provided that all output stages 3*a*', b', c', d' are activated and operate simultaneously, whereby each of the electrical variables converted by them are available at their respective output connection 5*a*', 5*b*', 5*c*', 5*d*'.

The possibility is then used in this realization to select one of the output connections 5' of the output stages with a controllable switch array 14', e.g., controllable by lines 13', to connect these to external connection 1' of the device. The converted electrical variable of the selected variable type can thereby be provided to a device which is not shown here, e.g., to a vehicle control device.

In this example of FIG. 7, it is evident that for the specific realization of output stages, e.g., operational amplifiers, variable resistors, switches, transistors, etc., are used, which optionally further have an application-specific external wiring.

Figure 8:
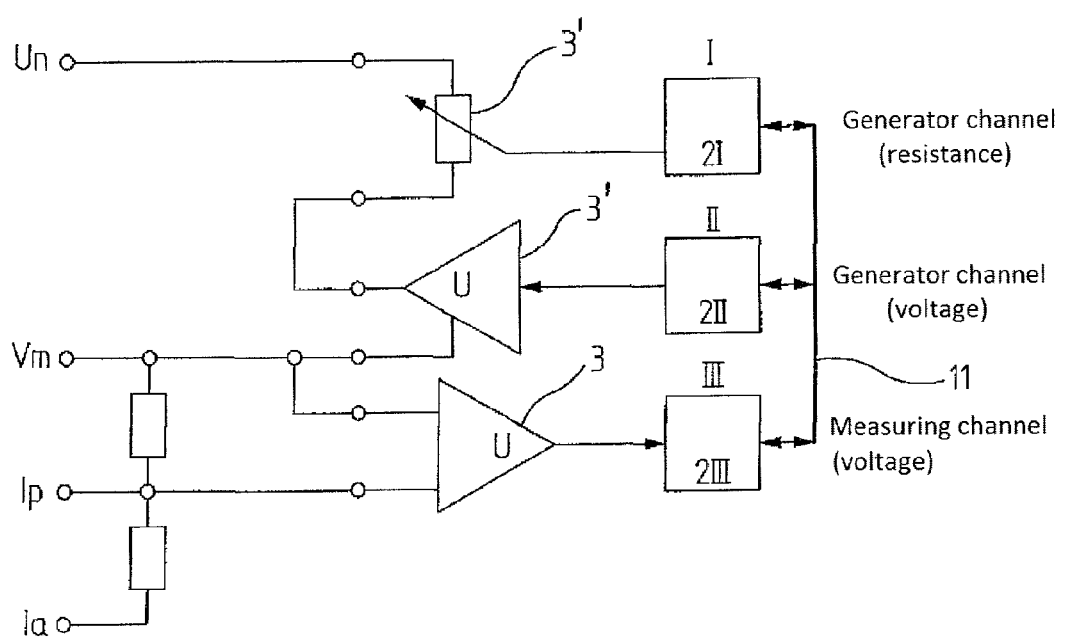
FIG. 8 illustrates an example of the combined utilization of a measurement device and generating device.

FIG. 8 shows an application example in which within the scope of a simulation for testing of a vehicle control device the function of a lambda probe can be tested or simulated. Here, two devices for generating electrical variables that are operating together with a device for measuring electrical variables.

For each of these three devices according to the invention, shown here by way of example, only the specifically used output stage or input stage is shown in converter 3 or 3'. Within the scope of the invention, however, essentially several selectable input or output stages are present.

Device I operates here to generate an electrical variable, namely, in the example to generate a resistance value. Device II generates a voltage as an electrical variable and device III is provided to measure a voltage. The function of the lambda probe can be simulated by the specifically selected type of additional electrical external interconnection of the specific inputs or outputs of the device (channels).

Thus, e.g., two values can be provided by a higher-order data processing system, namely, e.g., the exhaust gas temperature and the simulated oxygen content in the exhaust gas, i.e., the lambda value.

The predefined temperature is converted by control unit 21 into a resistance value and output as a simulated resistance, i.e., as an electric variable of the resistance type. The lambda value has an effect on the formed control loop between voltage generation in device II and voltage measurement in device III.

The individual devices I, II, and III are coupled to one another by bus 11. Apparently, therefore, devices for generating and also for measuring electrical variables work together for processing a specific simulation task.

The invention being thus described, it will be obvious that the same may be varied in many ways. Such variations are not to be regarded as a departure from the spirit and scope of the invention, and all such modifications as would be obvious to one skilled in the art are to be included within the scope of the following claims.

What is claimed is:

1. A device for measuring electrical variables, the device comprising:
an external measuring connection that is connectable to an electronic device to be tested;
at least one converter configured to convert a plurality of measurement variables, measurable or measured via the measuring connection, of different variable types into respective electrical measurement variables of a single predefined or predefinable variable type; and
a control device configured to control the converter and to select at least one variable type of the plurality of measurement variables that the converter will convert to the single predefined or predefinable variable type;
wherein the converter includes an independent input stage for each of at least two measurement variables of different variable types, each input stage configured to detect a different respective measurement variable of the at least two measurement variables and to convert the respective measurement variable into a predefined or predefinable variable type, the converted measurement variable of the predefined or predefinable variable type being provided at a signal output of the input stage, and
wherein an electrical signal provided at the measuring connection is analyzed in parallel at the at least two input stages for different variable types, such that the at least two input stages are operated parallel in time and provide their respective converted measurement variable of the same predefined or predefinable variable type substantially simultaneously at respective signal outputs of the input stages.

2. The device according to claim 1, wherein the converter includes at least two independent input stages for a measurement variable of one variable type, of which a first input stage is configured to detect the measurement variable digitally and a second input stage is configured to detect the measurement variable analogically and via which, in each case, the measurement variable of the one variable type is detectable and convertible to a measurement variable of the predefined or predefinable variable type.

3. The device according to claim 1, further comprising at least two signal evaluation units, via which a converted measurement variable of the predefined or predefinable variable type is evaluated or processed with respect to a technical criterion, and wherein each signal evaluation unit is assigned a different technical criterion.

4. The device according to claim 3, wherein a signal evaluation unit is switchable selectively by a control via a control unit to one of at least two signal outputs of different input stages.

5. The device according to claim 3, wherein at least two signal evaluation units are operatable substantially simultaneously in parallel and provide their respective evaluation or processing result to a control unit.

6. The device according to claim 1, further comprising a device for generating electrical variables with an external connection, which is connectable to an electronic device to be tested, wherein the device includes a converter that is configured to convert an electrical variable, applied at an input thereof, of a single predefined or predefinable variable type into a variable of a variable type that is selectable from a plurality of different generatable variable types, and is configured to output the variable via the connection, wherein a control unit for controlling the converter is provided and by means of a control a variable type to be generated by the converter is selected and a converter for at least two variable types to be generated has at least one independent output stage via which from an electrical variable of the predefined or predefinable variable type the electrical variable of the variable type to be output is output, which is present at an output of the output stage.

7. The device according to claim 6, wherein the converter for at least one variable type to be generated has at least two independent output stages, wherein each of these output stages is configured to generate a same variable with different electrical criteria and/or functions.

8. The device according to claim 7, wherein an output stage is configured to output the variable digitally and wherein an output stage is configured to output the variable analogically.

9. The device according to claim 6, wherein at least two generator units are configured to generate an electrical variable of the predefined or predefinable variable type, and wherein each generator unit is assigned a different technical generation type.

10. The device according to claim 9, wherein a generator unit is assigned a technical generation type "analog" and another generator unit the generation type "digital."

11. The device according to claim 9, wherein a generator unit is selectively switchable by a control via a control unit to one of at least two signal inputs of different output stages.

12. The device according to claim 1, wherein the control units of a measuring and/or generating channel are formed by a same common control unit.

13. The device according to claim 1, wherein a control unit comprises a microprocessor and/or a programmable arrangement of logic gates and a program memory and/or data memory and a program is running or gate functions are running in the control unit for the selective connection of signal evaluation units or generator units to one of the signal outputs or signal inputs of the input stages or output stages and/or for parameterization of the input stages or output stages and/or signal evaluation units or generator units.

14. The device according to claim 1, wherein the device is switchable between a function as a measuring or generating channel.

15. The device according to claim 1, wherein simulated information on a motor rotation angle and/or time is provided by a higher-order data processing system to the control unit during a test of a control device for motor vehicles.

16. The device according to claim 15, wherein a control unit is configured to change a parameterization during a runtime of a measurement and/or generation of a signal depending on the motor rotation angle and/or the time.

17. The device according to claim 1, wherein the device is configured, based on the measured and/or generated events in a measured or generated signal, to store a motor rotation angle and/or times predominating during these events and/or send them to a data processing system.

18. The device according to claim 1, wherein the control unit has a communication link with at least one additional device via a bus.

19. A method for measuring electrical variables of an electrical signal of an electronic device to be tested, the method comprising:
   applying the electrical signal at an external measuring connection of a measuring device;
   converting, via a converter of the measuring device, a plurality of measurement variables, measurable or measured over a same measuring connection, of different variable types, into respective electrical measurement variables of a single predefined or predefinable variable type;
   controlling the converter by a control unit;
   selecting, via a control, at least one variable type of the plurality of measurement variables to be converted by the converter;
   detecting the measurement variable of the at least one variable type in the converter, the converter including at least one independent input stage for each of at least two measurement variables of different variable types;
   converting the detected measurement variable into a predefined or predefinable variable type;
   providing the converted measurement variable of the predefined or predefinable variable type at a signal output of the input stage; and
   analyzing an electrical signal provided at the measuring connection in parallel at the at least two input stages for different variable types, such that the at least two input stages are operated parallel in time and provide their respective converted measurement variable of a same predefined or predefinable variable type substantially simultaneously at respective signal outputs of the input stages.

20. The method for measuring electrical variables according to claim 19, wherein for generating an electrical variable via at least one generating device, the generating device has an external connection that is connectable to an electronic device to be tested, wherein, via a converter of the generating device, an electrical variable, applied at the input of the converter, of a single predefined/predefinable variable type is selectively converted into a variable of a variable type that is selectable from a plurality of different generatable variable types, wherein the electrical variable of the converted variable type is output via the connection, wherein the converter is controllable by a control unit and a variable type to be generated with the converter is selectable by the control and a converter for at least two variable types to be generated has in each case at least one independent output stage via which, from an electrical variable of the predefined or predefinable variable type, the electrical variable of the variable type to be output is output at an output of the output stage.

21. The method for measuring electrical variables according to claim 19, wherein simulated information on a motor rotation angle and/or time is provided by a higher-order data processing system to the control unit during a test of a control device for motor vehicles.

22. The method for measuring electrical variables according to claim 21, wherein the control unit is configured to change a parameterization during a runtime of a measurement and/or generation of a signal depending on the motor rotation angle and/or the time.

23. The method for measuring electrical variables according to claim 19, wherein, based on the measured and/or generated events in a measured or generated signal, storing a motor rotation angle and/or times predominating during these events and/or sending them to a data processing system.

* * * * *